Patented July 29, 1952

2,605,164

UNITED STATES PATENT OFFICE 2,605,164

METHOD OF PROTECTING COLOR CHART IN DETERMINATION OF CHROMATE CONCENTRATIONS

Louis Earl Odell, Chicago, Ill., assignor to Dearborn Chemical Company, Chicago, Ill., a corporation of Illinois No Drawing. Application January 21, 1949, Serial No. 72,055

2 Claims. (Cl. 23—1)

The present invention relates to a method of protecting a color chart for the determination of chromate concentrations and more particularly relates to a method of improving the storage characteristics of such color charts prepared by the impregnation of bibulous media with benzidine and acid derivatives of benzidine.

It has heretofore been proposed to employ benzidine and acid derivatives of benzidine in a color test for the determination of chromate concentrations. For use in this method, a dry sheet of bibulous material is used which has been impregnated with a compound selected from the group of benzidine, benzidine di-hydrochloride and benzidine diacetate, a small amount of an organic acid, and, if desired, a starch to aid in retarding oxidation of the benzidine compound to its colored or quinoid form. Such compositions may be used in the quantitative determinatin of chromate concentrations by a simple spot test, since a sharp color break is obtained upon the exposure of the impregnated bibulous material to an aqueous solution of a water soluble chromate in concentrations such as are used in the cooling systems of internal combustion engines to inhibit the formation of rust therein.

I have now found that testing charts formed of bibulous material impregnated with the testing solution described above deteriorates upon standing, probably due to oxidation in the presence of moisture, so that, upon testing, no sharp color break is observed. Instead of this sharp color break, a gradual color change will be noted upon an increase in concentration of the chromate solution and it is impossible accurately to judge the concentration of the solution undergoing testing by this method.

In order to prevent the deterioration of the testing media in the manner as hereinbefore described, and to increase the storage life of the testing media, I have found that it is desirable to store the analytical compositions in the presence of a substantially dry atmosphere. This storage of the testing media may be carried out in any desired and suitable manner, as, for example, by storing the media in the presence of a desiccating agent, by storage in a vacuum, by storage in a closed container in an atmosphere of an inert dry gas, and in other ways well known to those skilled in the art.

By this storage in a dry atmosphere, it is possible to maintain the testing media in effective condition for an extended length of time.

Thus, it is not necessary to have on hand freshly prepared testing media at all times, nor is it necessary to underwrite the expense of discarding testing media after their short life of usefulness has expired, as has been heretofore necessary.

It is therefore an important object of the present invention to provide a method for the protection of oxidation-sensitive chromate testing materials by the storage of the material in a dry atmosphere.

It is another important object of the present invention to provide a container for the storage of testing media, including a bibulous material impregnated with benzidine or acid derivative thereof, the container being moisture-proof and having means for drying the interior thereof.

It is a further important object of the present invention to provide a method for prolonging the storage life of testing media, such as bibulous material impregnated with a solution of benzidine or a derivative of benzidine and an organic acid for the testing of aqueous chromate solutions by color developed in the media, which comprises storing the media in a closed container in the presence of a dry atmosphere to preserve the color sensitivity of the media.

Other and further objects of this invention will become apparent from the following description and appended claims.

The testing medium employed is a dry bibulous sheet material, such as a sheet of blotting paper, impregnated with a solution containing benzidine or an acid derivative of benzidine and also, optionally, containing an organic crystalline acid and a small quantity of starch. Typical analytical compositions may be prepared by immersing separate absorbent paper blotters in any of the following compositions:

I 1 g. benzidine dihydrochloride
20 g. citric acid
0.5 g. corn starch
250 ml. water

II 1 g. benzidine di-acetate
20 g. citric acid
0.5 g. corn starch
250 ml. water

III 1 g. benzidine
20 g. citric acid
0.5 g. corn starch
250 ml. ethyl alcohol

In the literature, the sensitivity of benzidine and its derivatives to light and oxidation has been described. However, I have found that the analytical compositions above described are relatively non-sensitive to light and oxidation, if kept away from moisture, but are definitely sensitive to oxidation in the presence of moisture. No appreciable color break can be observed with the use of these compositions for testing chromate solutions following storage for as short a time as two or three weeks if left exposed to oxidation under normal relative humidity conditions in a room.

This sensitivity to oxidation will be readily understood from the following experimental data:

Experiment I

Testing material for use in the testing of aqueous chromate concentrations of aqueous chromate solutions was prepared as follows:

0.5 g. soluble starch was placed in 250 ml. of distilled water and heated to boiling. The starch solution was cooled slightly and poured over one gram of benzidine di-hydrochloride and 20 grams of citric acid. Absorbent paper blotters were soaked in the resulting solution, when cooled, for thirty seconds, and then were allowed to drain vertically for thirty seconds. They were then placed horizontally and allowed to dry at 77° F. (relative humidity 50%).

The cards as prepared above, when promptly used, showed a color break of from deep blue to golden with greenish-blue flecks in the presence of a chromate solution containing two pounds of standard rust inhibiting solution, containing 62.5 parts by weight of sodium dichromate and 30 parts by weight of sodium carbonate in a total of 100 parts by weight of dry composition, per 100 gallons of water. After storage for a period of from seven to nine weeks at atmospheric conditions, no sharp color break was obtained upon exposure to chromate solutions of varying concentrations.

I have found that the deterioration of such analytical compositions may be prevented if, promptly after being prepared, the compositions are stored in the absence of moisture or, more particularly, in a dry atmosphere, regardless of whether oxygen is present in or is excluded from such atmosphere.

This storage may be carried out in any desired manner so long as contact between the analytical compositions and oxygen or oxidizing atmospheres in the presence of moisture is prevented. As exemplary of suitable means of preventing this contact with moisture, the analytical compositions may be stored under a vacuum in conventional desiccating apparatus in the presence of a suitable desiccant such as calcium chloride; the compositions may be stored within a closed but unevacuated container in the presence of a suitable desiccating agent such as calcium chloride or silica gel; or the compositions may be stored within a closed container containing any type of a suitable dried atmosphere. As hereinbefore explained, it is not necessary that the composition be maintained out of contact with oxygen to prevent deterioration of the properties of the composition, inasmuch as dry oxygen itself does not cause such deterioration. Various simple containers, such as metal foil, cellophane or other plastic membranes, or moisture-proof coated paper, may be employed for the wrapping, so long as some means is provided for preventing contact between the testing compositions and moisture. For example, a suitable package may comprise a waxed paper wrapping enclosing the analytical compositions and a small body of silica gel.

The dryness of the atmosphere is important, although the exact moisture content of the atmosphere need not be controlled within narrow limits.

Preferably, however, I have found that it is desirable to limit the moisture content of the atmosphere to that equivalent to an atmosphere having a dewpoint of —50° F. or less while a dewpoint of —80° F. or less is preferred for indefinite storage. Such an atmosphere may be readily obtained by the employment of conventional desiccating agents. For example, it has been found that one ounce of silica gel disposed within a quart container, assuming that the air in the container is saturated with moisture at room temperature, will give a dewpoint of —80° F. when static equilibrium is reached. Thus, it will readily be seen that my improved method of enhancing the storage characteristics of such analytical composition may be easily and readily carried out.

The following experimental data illustrates some of the test results obtained by the use of various means for maintaining the analytical compositions prepared as hereinbefore described in a dry atmosphere:

Experiment II

Cards prepared as described in connection with Experiment I, promptly after being prepared, were placed in a desiccator containing calcium chloride and the desiccator was evacuated. The desiccator was allowed to refill with carbon dioxide and the evacuation and refilling with carbon dioxide was repeated three times. After a storage period of approximately four months, the following test results were obtained in the presence of aqueous solutions containing the indicated amount of a rust inhibitor compound of equal parts of sodium dichromate and sodium carbonate.

| Length of Storage | Inhibitor Concentration per 100 gal. H$_2$O | Observed Color |
| --- | --- | --- |
| | lbs. | |
| None | 1.5 | Slight gold. |
| | 2 | Pronounced gold. |
| 4 months | 1.5 | Slight gold. |
| | 2 | Pronounced gold. |

A control consisting of a card prepared in exactly the same manner and stored under atmospheric conditions showed the development of no gold color when tested at the end of eight weeks. A similar control was run in connection with each of the following experiments and similar results were obtained.

Experiment III

Cards prepared as described in connection with Experiment I were stored in a sealed but unevacuated quart can containing the below specified quantities of silica gel. The following results were observed:

| Length of Storage | Inhibitor Concentration per 100 gal. H$_2$O | Observed Color |
| --- | --- | --- |
| | lbs. | |
| None | 1.5 | Very slight gold. |
| | 2 | Gold. |
| 3½ mos. (2 oz. silica gel) | 1.5 | Very slight gold. |
| | 2 | Pronounced gold. |
| 2 months (1 oz. silica gel) | 2 | Slight gold. |
| | 2.5 | Pronounced gold. |

Example IV

The following tests were conducted to determine various types of suitable wrapping which may be employed in conjunction with a desiccant to store the analytical compositions in a substantially dry atmosphere. The analytical compositions were prepared in the same manner as defined in Experiment I and the following results were obtained:

| Method of Wrapping | Length of Storage | Concentration per 100 gal. $H_2O$ | Observed Color |
|---|---|---|---|
| | mos. | lbs. | |
| None | None | 2 | Pronounced gold. |
| Compositions wrapped in moisture-proof cellophane with a desiccant and dipped in wax. | 2½ | 1.5 | Do. |
| Compositions wrapped in metal foil with a desiccant and dipped in wax. | 2½ | 1 | Very slight gold. |
| Do | 2½ | 2 | Pronounced gold. |
| Compositions wrapped in paper coated with a mixture of microcrystalline wax and paraffin wax with a desiccant. | 2 | 2 | Slight gold. |
| Do | 2 | 2.5 | Pronounced gold. |

From the experimental data hereinbefore given, it may be seen that the deterioration of the analytical compositions is substantially completely inhibited upon storage in the absence of moisture. The packaging of the analytical composition within a simple wrapping of waxed paper in the presence of a desiccant is sufficient to prevent storage deterioration even through the compositions may be exposed to oxygen. The advantages residing in the method of the present invention and the improved results obtained thereby will be evident to those skilled in the art.

It will, of course, be understood that various details of the process may be varied through a wide range without departing from the principles of this invention and it is, therefore, not the purpose to limit the patent granted hereon otherwise than necessitated by the scope of the appended claims.

I claim as my invention:

1. The method of protecting analytical compositions comprising a bibulous material impregnated with a reagent selected from the group consisting of benzidine and acid derivatives of benzidine which comprises promptly after preparation thereof storing and maintaining said compositions in a substantially moisture-free atmosphere having a dew point at least as low as $-50°$ F.

2. The method of protecting analytical compositions comprising a bibulous material impregnated with a reagent selected from the group consisting of benzidine and acid derivatives of benzidine which comprises promptly after preparation thereof disposing said compositions in a closed container in the presence of a desiccant, said desiccant being present in a sufficient amount to provide and maintain an atmosphere in said container having a dew point at least as low as $-50°$ F., and maintaining said compositions within said container until ready for use.

LOUIS EARL ODELL.

REFERENCES CITED

The following references are of record in the file of this patent:

UNITED STATES PATENTS

| Number | Name | Date |
|---|---|---|
| 1,947,578 | Bond | Feb. 20, 1934 |
| 2,167,304 | Kloz | July 25, 1939 |
| 2,283,867 | Flosdorf et al. | May 19, 1942 |
| 2,314,336 | Goodale | Mar. 23, 1943 |
| 2,428,681 | Waring | Oct. 14, 1947 |
| 2,460,065 | Davis | Jan. 25, 1949 |

OTHER REFERENCES

Mitchell, Recent Advances In Analytical Chemistry, Published by Blakiston's Son & Co., Inc., Philadelphia, Pa. 1931, page 129.

Flagg, John F., "Organic Reagents" Interscience Publishers Inc., New York 1948, page 233.